United States Patent [19]

Fischer

[11] 4,120,468

[45] Oct. 17, 1978

[54] REMOTELY PILOTED VEHICLE

[75] Inventor: Hans-Otto Fischer, Willich, Fed. Rep. of Germany

[73] Assignee: Rhein-Flugzeugbau GmbH, Monchengladbach, Fed. Rep. of Germany

[21] Appl. No.: 876,576

[22] Filed: Feb. 10, 1978

Related U.S. Application Data

[63] Continuation of Ser. No. 630,020, Nov. 7, 1975.

[30] Foreign Application Priority Data

Nov. 25, 1974 [DE] Fed. Rep. of Germany ....... 2455687

[51] Int. Cl.² .................................................. B64C 3/12
[52] U.S. Cl. ......................................... 244/13; 244/39; 244/45 R; 244/12.2
[58] Field of Search .................... 244/13, 190, 8, 17, 244/11, 12.2, 23 C, 35 R, 39, 19, 7 R, 7 A, 45 R; 46/74 D, 75; 416/223, 126

[56] References Cited

U.S. PATENT DOCUMENTS

| 1,264,152 | 4/1918 | Briggs | 244/39 |
| 1,712,529 | 5/1929 | Tallei | 244/39 |
| 2,036,011 | 3/1936 | Barrett | 244/39 |
| 2,176,542 | 10/1939 | Nicholson | 244/39 |
| 2,432,775 | 12/1947 | Lennon | 244/39 |
| 2,604,950 | 7/1952 | Sipe | 416/126 |
| 3,241,791 | 3/1966 | Piasecki | 244/17.19 |
| 3,564,134 | 2/1971 | Rue | 244/190 |
| 3,612,445 | 10/1971 | Phillips | 244/12.2 |

FOREIGN PATENT DOCUMENTS

| 748,443 | 7/1933 | France | 244/39 |
| 1,075,203 | 10/1954 | France | 244/17.11 |
| 523,623 | 4/1955 | Italy | 244/23 C |
| 547,021 | 8/1956 | Italy | 244/12.1 |
| 551,761 | 11/1956 | Italy | 244/23 C |

Primary Examiner—Galen L. Barefoot
Attorney, Agent, or Firm—Smyth, Pavitt, Siegemund, Jones & Martella

[57] ABSTRACT

The vehicle is constructed from a flat disc recessed in a slot in a thin, pencil-like fuselage having aft and front propulsion engines and mounted for rotating about the center of the disc and about an axis extending transversely to the disc and to the direction of extension of the fuselage.

10 Claims, 2 Drawing Figures

REMOTELY PILOTED VEHICLE

This is a continuation, of application Ser. No. 630,020, filed Nov. 7, 1975.

BACKGROUND OF THE INVENTION

The present invention relates to a remote controlled (piloted) aircraft constructed for aerodynamic lift.

Unmanned aircraft, also known as remotely piloted vehicles or RPV for short, are used, for example, for air reconnaissance or as attack aircraft. In order to obtain satisfactory and useful infrared or TV pictures, one needs an aircraft with a basically very stable platform or payload body which, in turn, is a part of a rather slowly flying aircraft. On the other hand, a slowly flying aircraft stabilized in that manner is an easy target particularly when flying at low altitudes.

Unmanned, remotely piloted vehicles are known in different varieties whereby, however, the typical craft is designed just as an airplane. Such a craft has a disadvantage in that it has a structurally defined direction of propagation and on sighting the craft per se, the orientation of its shape in the sky immediately yields information as to the direction in which it flies without requiring observation of the actual movement of the craft. The craft, therefore, can be attacked quite rapidly as its course is readily available just upon sighting, and its future positions are readily predictable. Lateral evasion maneuvers are possible only to a limited extent. Also high rolling and yawing movements during rapid course change introduce instabilities to a considerable extent.

DESCRIPTION OF THE INVENTION

It is an object of the present invention to provide a new and improved rather simply constructed and possibly relatively small aircraft, particularly for purposes of reconnaissance and which permits rather high transverse acceleration so as to be able to change its course quite rapidly.

In accordance with the preferred embodiment of the present invention, it is suggested to provide a plane, circular disc as basic, aerodynamic lift producing element for such a craft and to supplement that disc by a fuselage oriented in the direction of movement and propagation and being provided with means for propulsion and thrust production, with means for control and with a payload cabin, housing, platform or the like. Such a craft takes advantage of the fact that a plane, circular disc flies in an inherently stable attitude and permits oncoming flow to occur from all directions without experiencing rolling and yawing movements. The disc does not require any turning on a vertical axis. Therefore, the direction of flight and the course become per se unpredictable on the basis of observing the disc by itself.

In accordance with the preferred embodiment of the invention, it is furthermore suggested to provide the fuselage in a thin rod, bar or pencil-like configuration which can be turned about an axis which runs through the center of the disc and extends transversely to the disc and also transversely to the elongated extension of the fuselage. The fuselage preferably is longer than the diameter of the disc and has a slot through and in which the disc is lodged. Upon turning of this fuselage body, its thrust producing engine or engines are turned therewith so that the full thrust is available immediately and in any direction as given by the direction into which the body points. The disc does not follow the rotation so that the inertia of the device as a whole about the vertical axis does not enter into the consideration of the kinematics of the craft when turning. The center of gravity of the fuselage, of course, turns with the fuselage and, therefore, points always in the same direction in relation to the center of the disc in which thrust is being produced which, in turn, is the same direction (or almost the same direction) as the direction of the oncoming flow of air in relation to the disc. Therefore, thrust production and center of gravity remain associated to each other in exactly the same manner irrespective of the direction of flight in any instant, even during turning, so that stability of the craft is maintained for exactly that reason.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
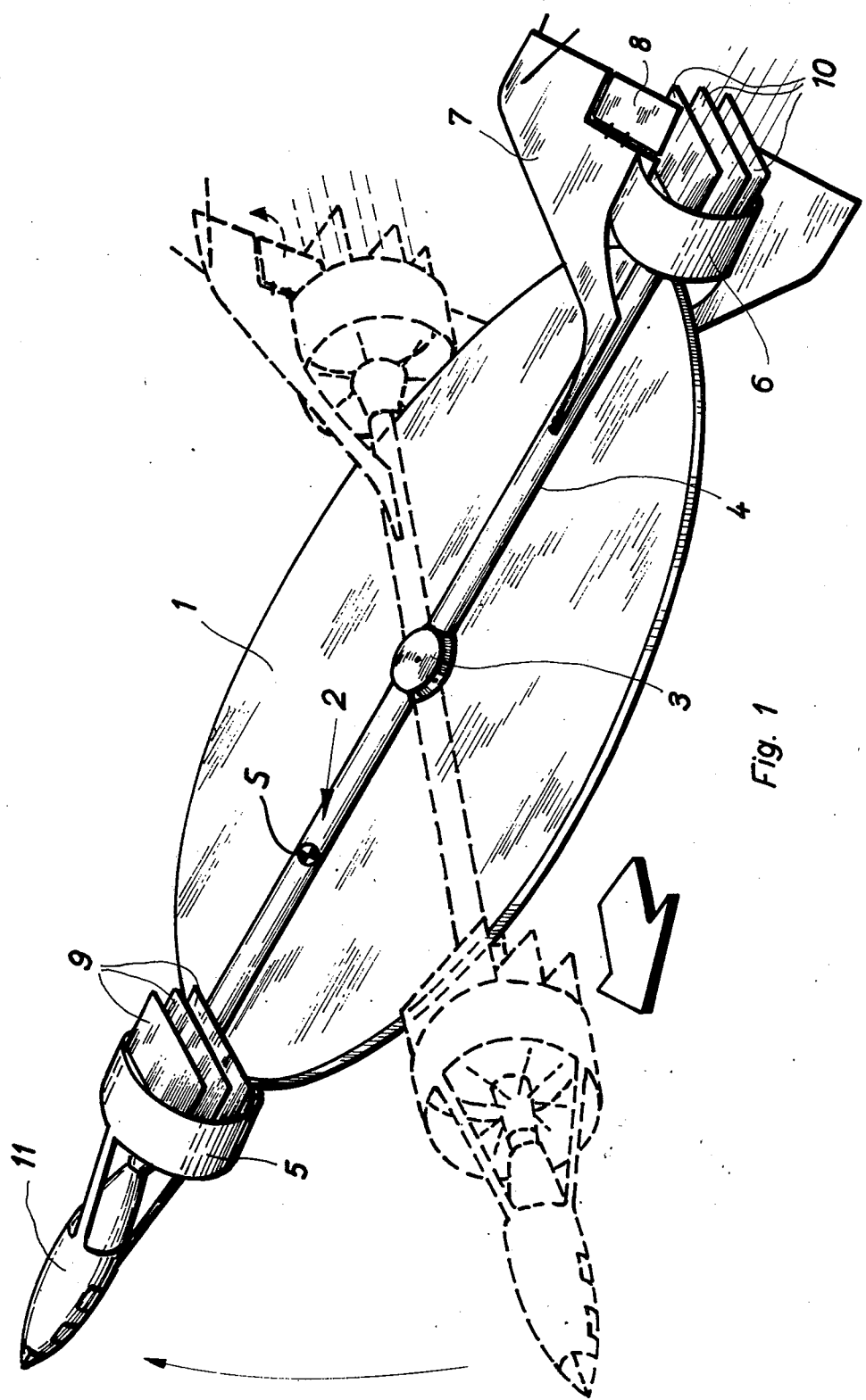
FIG. 1 is a perspective view of an aircraft in accordance with one example of the preferred embodiment of the present invention.

Proceeding now to the detailed description of the drawing, the aircraft as illustrated in FIG. 1 has a plane, circular disc 1 serving as the principal, aerodynamically lift producing element of the craft. This disc 1 is combined with a directionally effective, pencil or rod-like fuselage 2 which contains the means of the craft to produce thrust for propagation and maneuvering.

The rather thin fuselage 2 is pivotally or rotationally mounted in the center of disc 1 by means of a pivot mount 3 permitting turning the fuselage 2 on the center of the disc and in the same plane thereof. The axis of rotation extends transversely to both, the disc plane and the direction of elongated extension of the fuselage. The fuselage 2 is longer than the diameter of disc 1 and has a slot 4 which receives the disc. Therefore, so to speak, the disc 1 upon turning, turns inside of fuselage 2.

The fuselage 2 has and is integrated with two power plants 5 and 6 for production of propulsion and thrust. These two power plants and engines are respectively mounted in the front portion and in the aft portion of the fuselage, and both power plants are mounted outside of the perimeter of the disc. The aft portion of the fuselage 2 is additionally provided with a rudder 7 having rudder flaps 8. Each of the engines 5 and 6 is provided with thrust deflectors 9 and 10 respectively which are pivotal on axes extending parallel to each other and to the plane of extension of the disc.

Reference 11 denotes the cabin, payload housing or instrument platform and is constructed as a streamlined, aerodynamic body. The cabin of platform 11 is mounted in the front of fuselage 2 and particularly also in front of engine 5. Housing or platform 11 contains, for example, all of the reconnaissance instruments, and it may also include control and other equipment necessary for operating the craft as a remotely piloted vehicle.

Since the housing or platform 11 is placed relatively far in front of the fuselage, the center of gravity of the entire craft is displaced from the center of the disc. This center of gravity is denoted by character S, and it is displaced from the center of the disc by about 25% of the diameter of the disc. It should be noted, further, that the disc may contain a stabilizing gyro.

The payload in the cabin 11 may include the controls necessary for control of the craft. These controls may include an auto pilot to maintain the craft, e.g. at the different altitudes and on course. The controls may include a so-called homing device to permit the craft to return. In addition, preprogrammed controls may be provided so that the craft can undertake pseudo random course changes which, however, keep the craft on course on the average while seemingly erratic lateral movements are provided for purposes of evasion. Specifically, a stored program may provide for occasional or frequent rudder deflections to obtain course changes whereby the deflections and the periods in between are selected to obtain a sum total of zero deviation from the originally set course. Auto pilot, remote control and homing devices are known per se. The evasion program may simply be carried out e.g. through a tape that triggers rudder commands and which is prepared to obtain the desired pseudo random sequence of evasions.

The craft may take off by catapult start in a manner known per se. However, it is equally possible that the craft takes off just like a regular airplane, and gains altitude under automatic control. The craft sets course on the basis of the direction of orientation of fuselage 2. The flaps 9 and 10 as well as rudder 8 will at first serve merely for stabilizing and trimming. However, either by remote control or on the basis of a built-in program, the course of the craft can be changed in pseudorandom fashion. As stated, the change of course may be initiated merely by the rudder 8.

In particular, as the rudder 8 is deflected, the fuselage 2 will turn on disc 1. The disc 1 does not follow that turning so that the inertia of the craft relative to a vertical axis does not have to be considered as far as timing the turning operation is concerned and as far as the power is concerned needed to complete the maneuver. The full forward thrust is effective in every instant and in the particular direction in which the fuselage points. That is true not just for the beginning and the end of the turning maneuver but also during the turning of the fuselage on the disc.

The center of gravity S is turned with the fuselage so that thrust and lift production remain fixedly associated with the center of gravity. Particularly, the center of gravity is and remains substantially in line throughout with each new direction of oncoming flow, such direction vector being taken from the center of the disc. This particular behavior is instrumental for maintaining the craft in a stable position in each instance. Since the lift as effective is produced by and on a plane circular disc, the direction of flight is completely immaterial as far as lift production is concerned. And that, in turn, means that rolling and yawing movements do not occur when the craft changes direction. It can thus be seen that the craft's direction of movement becomes considerably less predictable which renders the craft less vulnerable to a successful attack.

For operating the craft, there will be included a maneuver program which is called for execution when the craft has reached, for example, enemy territory. As stated, the craft will change course unpredictably, rapidly and frequently, simply by alternating the rudder deflection 8 and by causing such rudder deflections in accordance with the program carried by the aircraft. The sum total of such maneuvers amounts in essence to a super positioning of transverse components of movement upon the initial course, and may be summed so that a predictable average course is maintained by the craft even though it undergoes numerous maneuvers in pseudorandom fashion.

Upon reaching the target area, it may be advisable to interrupt the program which introduces course changes, at least temporarily, so that the craft undergoes no acceleration or deceleration in any direction, and the reconnaissance operation may then be carried out. The guidance of the craft and particularly its return may be controlled by a homing device which is also known for unmanned aircraft and does not require elaboration.

The altitude of the craft may be maintained by a gyro stabilized autopilot which is also a device of known construction. Changing programs, etc. may readily permit returning of the craft, and for landing employment and deployment of a parachute may well be advisable which has been omitted from the drawing.

The essential part of this invention is depicted in the drawings and is related specifically to the combination of the thin pencil-like fuselage with front and aft propulsion means, and of the inserted disc as the main lift-producing element whereby this pencil-like fuselage can pivot on the center of the disc. The operation of the rudder and of other movable flaps is carried out in a conventional manner.

Figure 2:
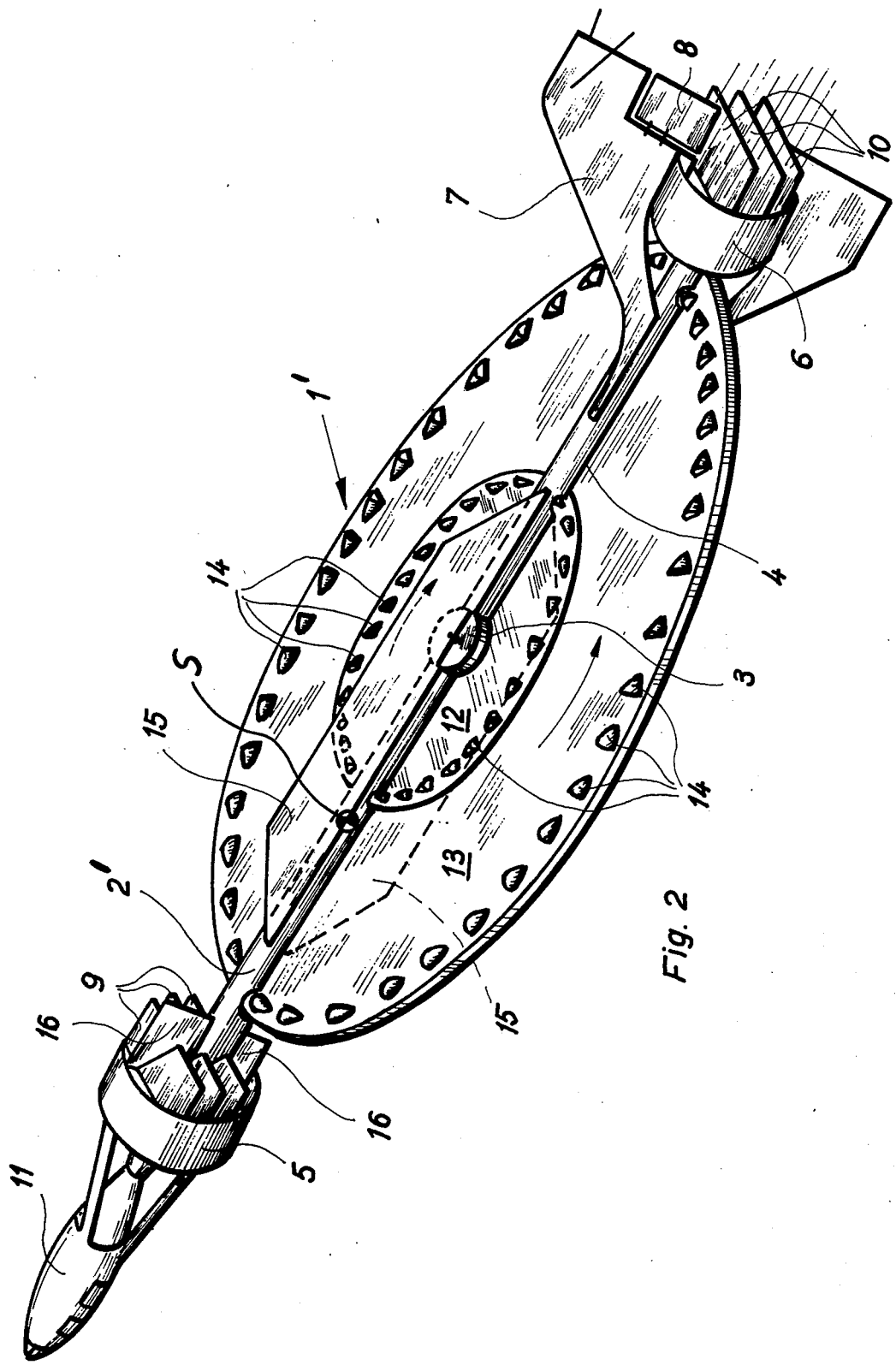
FIG. 2 is a similar view of a second example of the preferred embodiment.

The FIG. 2 shows a basically similar design which holds particularly true as far as the fuselage and associated elements are concerned having however certain additions which will be explained shortly. The main difference between the example of FIG. 2 and the example of FIG. 1 is to be seen in that the disc $1^1$ in this case has a center disc part 12 and an outer annulus 13 disposed co-planar with center disc 12 and rotatably connected thereto. Throughout the flight, disc 12 and annulus 13 are both driven for rotation but in opposite directions. One does not need any auxiliary drive here, rather, unidirectionally effective blades 14 are mounted along the respective peripheries of the top surfaces of the elements 12 and 13 so that air forces such as the jet from the front engine 5 as well as the air flowing over and along the craft sets the two elements 12 and 13 into rotation in opposite directions. Opposing rotation is necessary for compensating the rolling movement of each of the rotations resulting from the so-called Flettner effect, and, on the other hand, the precision movement has to be reduced. The particular construction is characterized by a highly significant improvement in the stability of the craft which is particularly important if the reconnaissance requires precision motion picture taking.

The pencil-like fuselage $2^1$ is additionally provided with fins 15; they are symmetrically arranged and extend respectively up and down from the fuselage $2^1$. The front engine is also provided with another fin 16. All these fins extend essentially at right angles to the plane disc $1^1$.

The fins 15 have the specific purpose to increase the resistance of the air in the direction of the previous direction of flight when the fuselage 2 is caused to turn on disc $1^1$. This construction permits a still faster change in the direction of flight. It is desirable to provide these fins above as well as below the disc 1 in order to compensate any residual movements on the longitudinal axis of the craft.

The invention is not limited to the embodiments described above but all changes and modifications thereof not constituting departures from the spirit and scope of the invention are intended to be included.

I claim:

1. Remotely piloted aircraft of the aerodynamic lift variety and constructed for rapid action course changes with little or no banking comprising, a plane disc for establishing and providing substantially all the aerodynamic lift of said aircraft during forward motion without rotation of the disc, and independently from any rotation of the disc; and a fuselage without wings and static lifting power and being mounted on the disc for unrestrained turning in its entirety, the fuselage having (a) propulsion means for producing thrust in the direction of extension of the fuselage; (b) means for control of the aircraft including turning of the thrust producing fuselage in relation to the disc for changing the direction of flight; (c) a payload housing; and (d) a center of gravity displaced in forward direction of an axis of turning of the disc; the direction of thrust production being changed upon turning of the fuselage on the disc.

2. Aircraft in accordance with claim 1 and comprising means for pivotally mounting the fuselage on the disc for rotation about an axis running through the center of the disc and extending at right angles to the plane of extension of the disc.

3. Aircraft as in claim 1, said fuselage being of pencil-like elongated construction, being mounted for rotation on the disc, and extending beyond the perimeter of the disc at both ends.

4. Aircraft as in claim 3, said fuselage having a slot, the disc being received by and turning in that slot.

5. Aircraft as in claim 1, wherein the fuselage is of elongated construction and having said propulsion means disposed outside of the perimeter of the disc.

6. Aircraft as in claim 1, said populsion means including jet and thrust producing means and means for deflecting the jet.

7. Aircraft as in claim 5, said payload housing being also disposed on the fuselage outside of the perimeter of the disc.

8. Aircraft as in claim 1, said disc including a rotating center portion and outer, annulus rotating in opposite directions.

9. Aircraft as in claim 8 including means on said center and said outer annulus responsive to airflow along the disc for providing for rotations of the center portion and of said annulus.

10. Aircraft as in claim 1, said fuselage being of thin elongated construction having vertically extending fins.

* * * * *